No. 784,782. PATENTED MAR. 14, 1905.
U. DURAND.
BARB FOR WIRE FENCING.
APPLICATION FILED JAN. 13, 1905.

No. 784,782. Patented March 14, 1905.

UNITED STATES PATENT OFFICE.

ULRICH DURAND, OF KANKAKEE, ILLINOIS.

BARB FOR WIRE FENCING.

SPECIFICATION forming part of Letters Patent No. 784,782, dated March 14, 1905.

Application filed January 13, 1905. Serial No. 240,937.

*To all whom it may concern:*

Be it known that I, ULRICH DURAND, a citizen of the United States, residing at Kankakee, in the county of Kankakee and State of Illinois, have invented certain new and useful Improvements in Barbs for Wire Fencing, of which the following is a specification.

As ordinarily constructed the barbs on barbed-wire fencing are rigidly secured to the line-wires, so that animals are frequently injured by rubbing against the fence, because the rigidly-secured barbs tear the hide and oftentimes inflict such injuries that they become useless and have to be killed.

My invention consists of a revolving barb mounted in a casing and adapted to be applied to any two-strand wire fence, being constructed with a casing for the revolving spur-like barb, having recesses at its ends to receive the strands of wire and securely hold the casing and barb in position.

My invention will be described hereinafter and illustrated in the accompanying drawings, in which—

Figure 1:
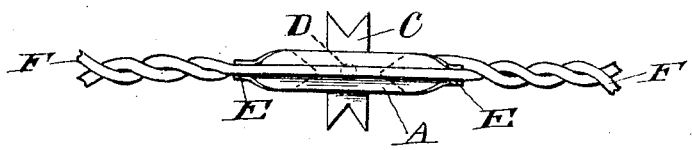
Figure 2:
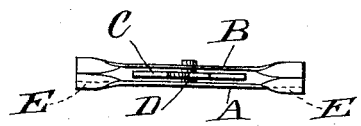
Figure 3:
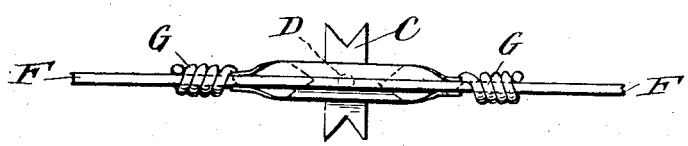
Figure 4:
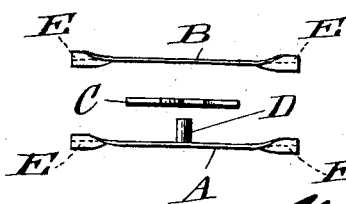

Figure 1 is a view of a fragment of a fence-wire, showing my barb in position; Fig. 2, an edge view of the barb and casing detached from the fence-wire; Fig. 3, a view showing my device applied to a single-strand fence-wire, and Fig. 4 a detail view of the barb and casing before being assembled.

In the drawings similar reference characters indicate corresponding parts throughout the several views.

My invention consists of two plates A and B, secured together at their ends and having their central portions spread apart or bulged to receive the circular pointed barb C, revolubly mounted on a stud D, secured to plate A and pressing against plate B. The edges of plates A and B at their ends are bent outwardly to form recesses E to receive the strands of the line-wire F in securing the barb in place.

It will be understood that my barb may be applied to any two-ply wire fence by spreading the wires apart, so as to permit the insertion of the casing therebetween, the strands of wire resting in the recesses E and holding the barb securely from displacement. To remove the barb from the fence, it is only necessary to again spread the wires, when the casing can be readily taken out.

In Fig. 1 I show my invention applied to a two-ply twisted wire; but it will be readily understood that it can be applied to any two-ply wire the strands of which may be spread or may be applied to a single strand of wire by the method shown in Fig. 3, in which the fence-wire rests in the recesses on one side of the casing and a short piece of wire G is inserted in the recesses on the other side of the casing and secured at each end thereof to the line-wire.

Having thus described my invention, what I claim is—

1. In combination with a fence line-wire, a casing consisting of two metal strips secured together at their ends and having their outer edges bent outwardly to form recesses to receive the strands of the line-wire, and a barb revolubly mounted in the casing, substantially as shown and described.

2. In combination with a fence line-wire, a casing consisting of two metal strips secured together at their ends and having their outer edges bent outwardly to form recesses to receive the strands of the line-wire, a stud secured to one strip and pressing against the other, and a circular, pointed barb revolubly mounted on said stud, substantially as shown and described.

In testimony whereof I hereto affix my signature in the presence of two witnesses.

ULRICH DURAND.

Witnesses:
F. L. FRASER,
J. BERT. MILLER.